United States Patent [19]

Sloane

[11] Patent Number: 4,484,770
[45] Date of Patent: Nov. 27, 1984

[54] TUBING AND FITTINGS WITH CAST-IN-PLACE LINERS

[76] Inventor: Glenn L. Sloane, 8825 Colbath, Panorama City, Calif. 91402

[21] Appl. No.: 366,988

[22] Filed: Apr. 9, 1982

[51] Int. Cl.³ ............................................. F16L 9/14
[52] U.S. Cl. ..................................... 285/55; 285/156; 285/332.3; 285/334.5; 285/354
[58] Field of Search ............. 285/55, 334.5, DIG. 16, 285/156, 332.3, 354

[56] References Cited

U.S. PATENT DOCUMENTS

| 3,338,598 | 8/1967 | Kurtz | 285/55 |
| 4,313,625 | 2/1982 | West | 285/55 |

FOREIGN PATENT DOCUMENTS

| 2633465 | 2/1978 | Fed. Rep. of Germany | 285/55 |
| 7010515 | 1/1971 | Netherlands | 285/55 |
| 363206 | 8/1962 | Switzerland | 285/55 |
| 867569 | 5/1961 | United Kingdom | 285/55 |

Primary Examiner—Dave W. Arola
Attorney, Agent, or Firm—Donald D. Mon

[57] ABSTRACT

Tubing and fittings with cast-in-place liners. Relatively thin and lightweight liners can be made of relatively expensive or inconvenient materials to provide chemical resistance or other special requirements. The liner can be cast in place in a jacket made of less expensive material to provide the necessary strength. To couple a pair of these tubings, the jacket of one is cut back to expose an end portion of the liner. The exposed end portion is flared outwardly against a sleeve to form a tapered seal surface. The liner of the other tubing has a nose that projects beyond the end of its jacket with a tapered seal surface that bears against the other tapered surface. A compression device such as a nut or a clamp holds the tubings together.

9 Claims, 8 Drawing Figures

U.S. Patent    Nov. 27, 1984    4,484,770
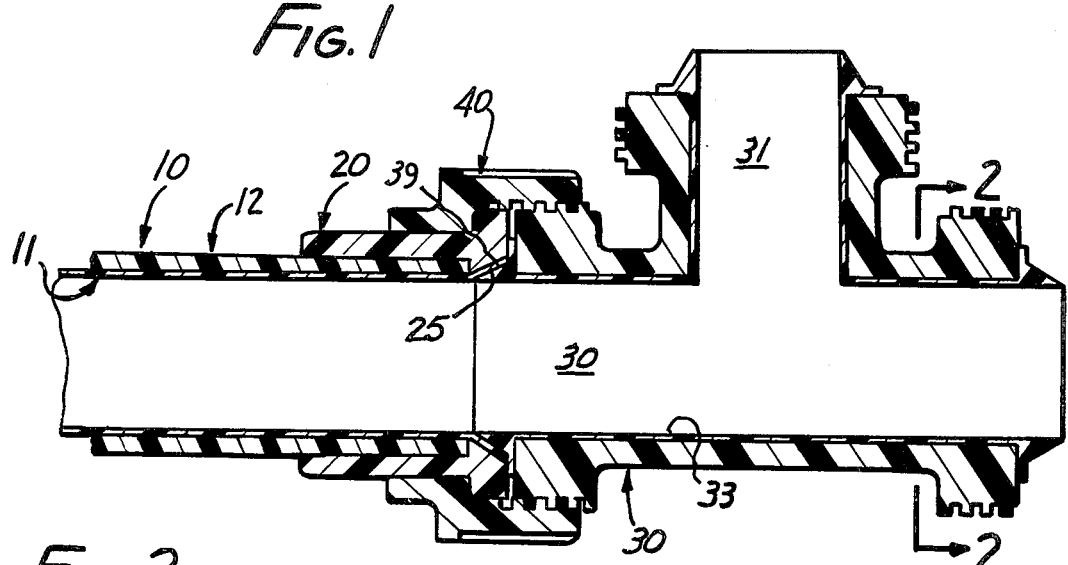
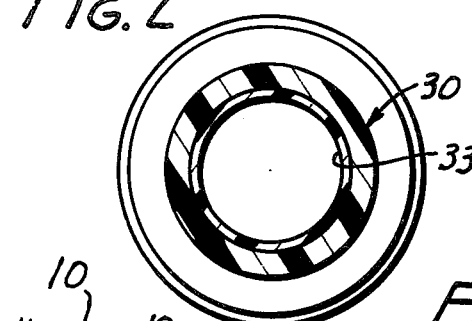
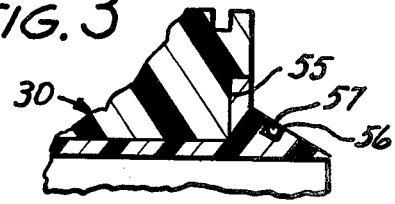
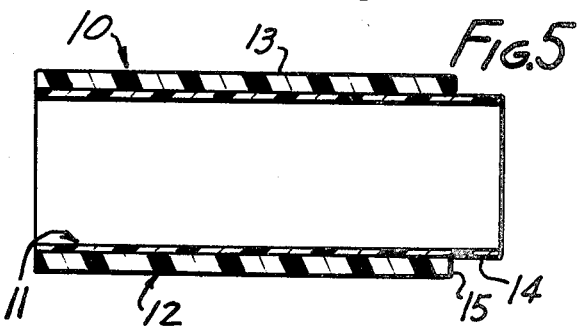
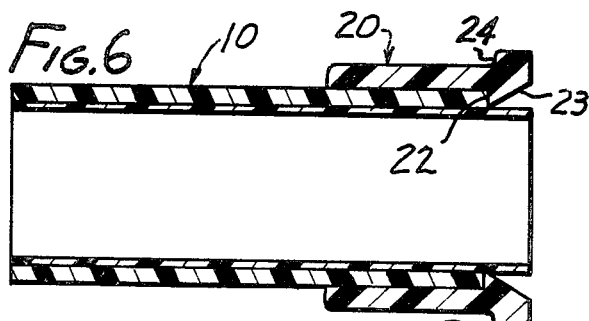
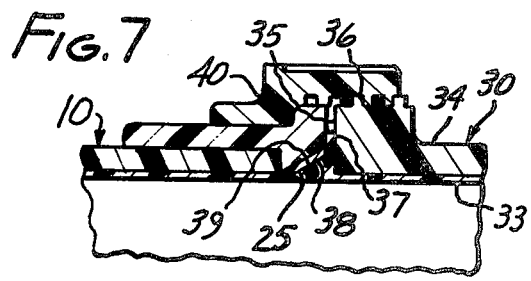
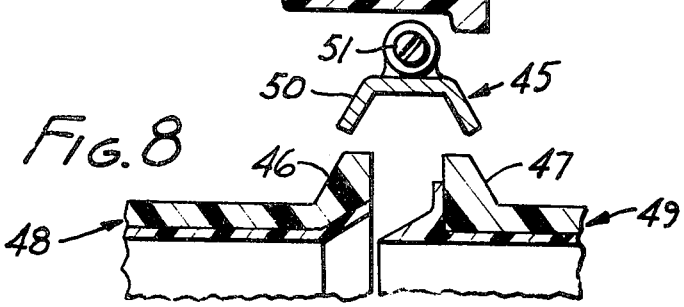

> 4,484,770

TUBING AND FITTINGS WITH CAST-IN-PLACE LINERS

FIELD OF THE INVENTION

This invention relates to tubing and fittings which have cast-in-place liners, and to joinders for them.

BACKGROUND OF THE INVENTION

In order to provide for special requirements such as corrosion resistance, it is common practice to make entire valve and tubing structures from a material which has the necessary properties. This is tolerable if the material is not too expensive, or if the nature of the installation is such that it can absorb the expense. Often, however, a relatively expensive material, or one which is difficult to employ, must be used. For such installations, it would be good practice, if possible to utilize less expensive material for strength and structure, and the more expensive material only as a liner and seal.

Pipe linings are, of course, well known in the art. Slush coatings, and wiped-on coatings are known for both the inside and outside walls of pipes. Also, plated coatings are known. A problem with many of the prior art expedients is that they often have faults and leaks, and in some installations this can lead to expensive and dangerous situations.

It is an object of this invention to provide tubings and fittings which have cast-in-place liners that are unlikely to have faults or leaks, that are cast into jackets of relatively inexpensive materials such as organic plastic materials.

Another object of this invention is to provide coupling assemblies for such tubings and fittings, that are expedient to prepare and install.

BRIEF DESCRIPTION OF THE INVENTION

This invention utilizes two tubular conduits. Either or both of them may merely be a pipe, or may be a fitting such as a union or branch fitting. One tubular conduit has a central tubular liner and an outer organic plastic jacket surrounding the liner and having an outer wall. An end of the outer jacket is cut back to expose a length of the liner. A sleeve member is placed around the outer wall and bears against the shoulder on the jacket. It provides a forming surface against which the exposed length of liner is pressed, thereby forming a seal surface.

A second tubular conduit also has a central liner and an organic plastic jacket. This liner extends beyond an end of the jacket where it forms a tapered nose with a seal surface that is complementary to the first named seal surface.

Compressive means such as a nut or a clamp holds the tubular conduit together.

According to a preferred but optional feature of the invention, the liners are made of organic plastic material such as polytetrafluoroethylene sold commercially under the trademark Teflon.

The above and other features of this invention will be fully understood from the following detailed description and the accompanying drawings, in which:

BRIEF DESCRIPTION OF THE DRAWINGS

FIG. 1 is an axial cross-section of a joined tubing and fitting according to the invention;

FIG. 2 is a cross-section taken at line 2—2 in FIG. 1;

FIG. 3 is an enlarged fragment of an optional portion of one of the liners;

FIGS. 4-7 are axial sections showing successive steps in making the assembly of FIG. 1; and FIG. 8 shows another means to hold the tubings together.

DETAILED DESCRIPTION OF THE INVENTION

In FIG. 1 there is shown a first tubular conduit 10 which has a tubular liner 11 and an outer jacket 12 which is preferably made of organic plastic material. The material of the tubular liner 11 is selected for some special property such as chemical resistance. A convenient example is Teflon. The outer material may be less sensitive to those conditions and considerably less expensive, for example polyvinyl chloride or polyvinyl acetate pipe. The two should be temperature-compatible, so that casting one around the other does not change the shape or properties of the other.

Conduit 10 has an outer wall 13. At the right hand end shown in FIGS. 4 and 5, the outer jacket has been cut back to expose a length 14 of the tubular liner, thereby to form at the end of the outer wall an abutment shoulder 15.

As best shown in FIG. 6 a sleeve member 20 is fitted over the end of the conduit 10 which is cut back. The sleeve includes a tubular portion 21 which engages and is preferably fixed to the outer wall of the jacket. While a friction fit is adequate and meets the definition of "fixed" in many installations it will be preferable either to adhesively bond it or to sonically bond it to the outer jacket. The sleeve includes an internal step 22 which bears against abutment shoulder 15. The sleeve member further carries a tapered forming surface 23 which enlarges in diameter as it extends away from the abutment shoulder. The sleeve also carries a nut retaining flange 24 on its external periphery.

A forming tool (not shown) such as a heated element is applied to the exposed length, and this reforms it to the shape shown in FIG. 7 so as to make a tapered seal surface 25. If the initial forming does not make a smooth or accurate surface, it can be modified by a cutting tool.

A second tubular conduit 30 is shown as part of a larger fitting which in this case is a union having two other tubular exits, two tubular ports and passages 31, 32 which are fluidly interconnected with tubular conduit 30. This fitting, and of course, the second tubular conduit, includes a liner 33 which at the tubular conduit 30 portion is tubular. It is cast-in-place in an outer jacket 34, which is preferably made of orgnic material. The materials usually will be the same as those utilized in the first tubular conduit. The outer jacket includes an abutment surface 35 and an external thread 36 surrounding the tubular conduit.

The central liner further includes a flange 37 which bears against abutment surface 35, and beyond the end of the outer jacket a nose 38 with a seal surface 39 whose shape is complementary to the seal surface on the first tubular member.

Compression means 40, in this example a nut, has an internal shoulder 41 to engage shoulder 24 on the sleeve, and an internal thread 42 to engage thread 36 on the second tubular conduit.

The assembly of the foregoing is shown in FIG. 7. It will be appreciated that the exposed length 14 will have been formed against the tapered forming surface 23 so as to form its tapered seal surface 25 as shown in FIG.

7. Then the two tubular conduits are brought together and the nut is threaded on to the thread so as to clamp the two tubular members together, the nut being one embodiment of compression means.

Another embodiment of compression means is shown in FIG. 8, wherein a Harmon-type metal clamp 45 is applied to tapered shoulders 46, 47 on respective first and second tubular conduits 48, 49, all other features being identical. The Harmon clamp includes a circular band 50 and a screw 51 to tighten the band thereby to draw the tubular conduits together and hold the clamp together.

FIG. 3 shows a useful modification of the end of the second tubular conduit 30. It is modified by providing a recess 55 to receive flange 37 of the liner. It may further be modified by providing an O-ring recess 56 and an O-ring 57 for making a more reliable seal.

A tubing with a cast-in-place liner may be formed by any suitable process. For example, the liner may be formed as a tube, and then passed through a crosshead extruder to apply the outer jacket.

A fitting, or in general any structure which includes an end such as on the second tubular conduit must be cast-in-place in a mold. The complex shape of the liner itself can readily be molded, and then this structure can be placed in a cavity so as to receive the outer jacket in a conventional molding process.

It will be understood that the fitting as shown may have more or fewer ports and passages and may also be utilized as a connector between two lengths of tubing such as the first tubular conduit.

This invention enables the use of relatively inexpensive materials for the main strength of the conduitry and lesser quantities of more expensive or more troublesome materials for the inside liner. Because of the processes used, flaws and pores in the construction are unlikely to occur, and parts are readily manufactured and the combination is easily assembled.

This invention is not to be limited by the embodiments shown in the drawings and described in the description which are given by way of example and not of limitation, but only in accordance with the scope of the appended claims.

I claim:

1. In combination:
a first tubular conduit comprising a central tubular liner and an outer organic plastic jacket cast upon and surrounding said liner and having an outer wall, said conduit having an end, said outer jacket being recessed from said end to expose the surface of a length of the central liner, and to form an abutment shoulder on the end of said outer jacket; a sleeve member having a central passage adapted to fit over and embrace said outer wall of said outer jacket, an internal step so disposed and arranged as to bear against said abutment shoulder, and a tapered forming surface which enlarges as its extends away from said abutment shoulder, said exposed portion being displaced against the forming surface whereby to form a tapered seal surface; a second tubular conduit having a central tubular liner, an outer organic plastic jacket cast upon and surrounding said last-named tubular liner, said jacket having adjacent said end an abutment surface, a flange on said last-named liner engaging said last-named abutment surface, and a tapered nose on said liner extending beyond said last-named end forming a tapered seal surface that is complementary to said seal surface on said first tubular conduit, whereby said tubular conduits are joined and sealed at the said ends by abutment of said seal surfaces; and compression means engaging said tubular conduits and holding them together.

2. A combination according to claim 1 in which said compression means comprises an internally threaded nut, in which a nut retaining flange is formed on one of said tubular conduits, and in which a nut engaging thread is formed on the other of said tubular conduits.

3. A combination according to claim 1 in which said compression means comprises a clamp, and in which each of said tubular conduits has a shoulder engageable by said clamp to draw said tubular conduits together.

4. A combination according to claim 1 in which said sleeve is fixed to its respective outer jacket.

5. A combination according to claim 4 in which said sleeve is adhesively fixed to its respective outer jacket.

6. A combination according to claim 4 in which said sleeve is fused to its respective outer jacket.

7. A combination according to claim 1 in which said liners are made of a moldable material.

8. A combination according to claim 1 in which said liners are made of a moldable organic plastic material.

9. A combination according to claim 1 in which said liners are made of polytetrafluoroethylene.

* * * * *